(12) United States Patent
Fagundes et al.

(10) Patent No.: US 10,703,488 B2
(45) Date of Patent: Jul. 7, 2020

(54) AIRCRAFT AIR QUALITY MONITORING SYSTEM AND METHOD

(71) Applicant: BOMBARDIER INC., Dorval (CA)

(72) Inventors: Sandro A. S. Fagundes, Pointe-Claire (CA); Boris Meislitzer, Pointe-Claire (CA); Keith Ayre, Montreal (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 15/575,016

(22) PCT Filed: May 16, 2016

(86) PCT No.: PCT/IB2016/052831
§ 371 (c)(1),
(2) Date: Nov. 17, 2017

(87) PCT Pub. No.: WO2016/189420
PCT Pub. Date: Dec. 1, 2016

(65) Prior Publication Data
US 2018/0148180 A1 May 31, 2018

Related U.S. Application Data

(60) Provisional application No. 62/165,269, filed on May 22, 2015.

(51) Int. Cl.
*B64D 13/06* (2006.01)
*B64D 45/00* (2006.01)
*B64D 13/00* (2006.01)

(52) U.S. Cl.
CPC ............ *B64D 13/06* (2013.01); *B64D 13/00* (2013.01); *B64D 45/00* (2013.01);
(Continued)

(58) Field of Classification Search
None
See application file for complete search history.

(56) References Cited

U.S. PATENT DOCUMENTS 4,733,605 A 3/1988 Holter et al.
5,462,485 A 10/1995 Kinkead
(Continued)

FOREIGN PATENT DOCUMENTS

WO 2014072619 A1 5/2014

OTHER PUBLICATIONS

PCT international Search Report and Written Opinion dated Aug. 9, 2016 re: International Application No. PCT/IB2016/052831.
(Continued)

*Primary Examiner* — Todd M Melton
*Assistant Examiner* — Jason R Roberson
(74) *Attorney, Agent, or Firm* — Norton Rose Fulbright Canada LLP

(57) ABSTRACT

Air quality sensors are incorporated into an aircraft ventilation system in order to detect the nature and concentration of possible contaminants in the air flow passages. Data from the sensors may also be used to monitor air quality trends, determine corrective measures, and provide maintenance alerts. The sensors are provided at strategic locations throughout the ventilation system, such as before and/or after an air compressor and before and/or after a recirculation system, in order to identify where the problem is occurring.

16 Claims, 9 Drawing Sheets

(52) U.S. Cl.
CPC ....... *B64D 2013/0688* (2013.01); *Y02T 50/54* (2013.01); *Y02T 50/56* (2013.01)

(56) References Cited

U.S. PATENT DOCUMENTS

| | | |
|---|---|---|
| 5,695,396 A | 12/1997 | Markwart et al. |
| 5,742,516 A | 4/1998 | Olcerst |
| 5,750,999 A | 5/1998 | Fox |
| 5,791,982 A | 8/1998 | Curry et al. |
| 6,449,963 B1 | 9/2002 | Ng et al. |
| 6,503,462 B1 | 1/2003 | Michalakos et al. |
| 6,711,470 B1 | 3/2004 | Hartenstein et al. |
| 6,817,576 B2 | 11/2004 | Brady et al. |
| 6,941,806 B2 | 9/2005 | Burns et al. |
| 7,857,892 B2 | 12/2010 | Marra |
| 8,092,285 B2 | 1/2012 | Mathur et al. |
| 8,206,475 B2 | 6/2012 | Walkinshaw |
| 8,452,489 B2 | 5/2013 | Marra |
| 8,560,146 B2 | 10/2013 | Kwon et al. |
| 8,636,003 B2 | 1/2014 | Deutscher et al. |
| 8,674,842 B2 | 3/2014 | Zishaan |
| 8,733,355 B2 | 5/2014 | Turiello |
| 8,840,841 B2 | 9/2014 | Roberts |
| 2008/0283663 A1* | 11/2008 | Space ............ B64D 13/06 244/118.5 |
| 2010/0203818 A1 | 8/2010 | Gray et al. |
| 2011/0046822 A1 | 2/2011 | Gray et al. |
| 2012/0068862 A1* | 3/2012 | Tillotson ............ B64D 45/00 340/963 |
| 2012/0117974 A1 | 5/2012 | Hilgeman et al. |
| 2013/0030718 A1 | 1/2013 | Williams et al. |
| 2013/0231035 A1 | 9/2013 | Desmarais et al. |
| 2014/0323026 A1 | 10/2014 | Lewis et al. |
| 2015/0099444 A1 | 4/2015 | Le et al. |
| 2015/0268073 A1* | 9/2015 | Gaully ............ B64D 13/00 702/47 |
| 2016/0214723 A1* | 7/2016 | Fox ............ B64D 13/06 |
| 2016/0214724 A1* | 7/2016 | Fox ............ B64D 13/06 |
| 2017/0158186 A1* | 6/2017 | Soifer ............ B60W 10/30 |

OTHER PUBLICATIONS

James A. Hall Jr. et al., Monitoring Aircraft Cabin Particulate Matter Using a Wireless Sensor Network, Electrical and Computer Engineering Faculty Publications and Presentations, Jul. 14, 2013, pp. 1-17, 43rd International Conference on Environmental Systems, American Institute of Aeronautics and Astronautics, United States of America.

English translation of International Publication No. WO 2014/072619A1 dated May 15, 2014, accessed on Nov. 13, 2017, https://www.google.ca/patents/WO2014072619A1?cl=en&dq=WO2014072619+(A1)&hl=en&sa=X&ved=0ahUKEwj36OHu7LvXAhXr5oMKHVBcCXsQ6AEIKDAA.

E. A. Timby, Airflow Rate Requirements in Passenger Aircraft, Ministry of Aviation Supply—Aeronautical Research Council, 1970, C.P. No. 1136, London: Her Majesty's Stationery Office, London.

PCT international Search Report and Written Opinion dated Jul. 27, 2016 re: International Application No. PCT/IB2016/052832.

U.S. Patent and Trademark Office, Office Action dated Jan. 28, 2020 re: U.S. Appl. No. 15/575,411.

* cited by examiner

AIRCRAFT AIR QUALITY MONITORING SYSTEM AND METHOD

CROSS-REFERENCE TO RELATED APPLICATIONS

This application is a national phase application under 35 U.S.C. 371 of International Patent Application No. PCT/IB2016/052831 filed on May 16, 2016, which claims priority from U.S. application No. 62/165,269 filed May 22, 2015, entitled "Aircraft Air Quality Monitoring System and Method", the entire contents of which are hereby incorporated by reference.

TECHNICAL FIELD

The present invention relates to the field of aircraft air management and more particularly, to monitoring the air quality in air flow passages of an aircraft ventilation system.

BACKGROUND OF THE ART

The quality of air in the cabin/cockpit of an aircraft is controlled through a ventilation system that combines various air sources, such as bleed air and filtered, recirculated air. Occurrences of hazardous smells, odors, or smoke are systematically reported by operator crews. Such events may occur during flight or ground operation. The sources of smoke and smell are variable and typically hard to identify. Pilot experience is often relied upon to determine which air source is providing the contamination and how to address the issue, combined with aircraft operating procedures. An inability to eliminate odor/smoke may cause the need for a flight diversion, flight cancellation, or emergency landing to ensure the safety of passengers and crew, which leads to inconvenience and increased costs.

Therefore, there is a need to address this issue.

SUMMARY

Air quality sensors are incorporated into an aircraft ventilation system in order to detect the nature and concentration of possible contaminants in the air flow passages. Data from the sensors may also be used to monitor air quality trends, determine corrective measures, and provide maintenance alerts. The sensors are provided at strategic locations throughout the ventilation system, such as before and/or after an air compressor and before and/or after a recirculation system, in order to identify where the problem is occurring.

Sensor data may be used for real time monitoring in three possible ways:
(1) Passive monitoring, whereby recorded data is simply presented to air and/or ground crew;
(2) Active monitoring, whereby a corrective action is suggested to air and/or ground crew on the basis of the recorded data from the sensor network; and
(3) Active control, whereby a corrective action is initiated automatically on the basis of the recorded data, with a dedicated or embedded controller.

Sensor data may also be used for monitoring of performance and degradation trends of components with an aircraft, such as components of an aircraft ventilation system, impacting air quality within the aircraft.

The number of sensors, their position, and the targeted contaminants can vary as a function of a configuration of the aircraft, a system architecture, and an operational profile.

In accordance with a first broad aspect, there is provided an aircraft comprising a first sensor between an air compressor and an aircraft cabin for sensing a first concentration level of at least one predefined airborne contaminant in a first air flow passage in an aircraft ventilation system; a second sensor between an aircraft recirculation system and the aircraft cabin for sensing a second concentration level of the at least one predefined airborne contaminant in a second air flow passage in the aircraft ventilation system; and an air quality monitoring system connected to the first sensor and the second sensor, and configured for triggering an alert signal if either one of the first concentration level and the second concentration level exceeds a threshold, the alert signal identifying at least one of the first air flow passage and the second air flow passage as a location for a possible contamination of an air quality in the aircraft.

In some embodiments, the air compressor comprises at least one of an engine and an auxiliary power unit. For example, the engine may comprise a left engine and a right engine, and the first sensor may comprise a left engine sensor and a right engine sensor. In some embodiments, the aircraft further comprises a third sensor between a left air conditioning system and the cabin, and a fourth sensor between a right air conditioning system and the cabin, wherein the left air conditioning system is connected between the left engine and the cabin, and the right air conditioning system is connected between the right engine and the cabin.

In some embodiments, the air quality monitoring system interfaces with an engine-indicating and crew-alerting system (EICAS) to provide the alert signal and display a corrective action to the flight crew.

In some embodiments, a corrective action is automatically performed by the air quality monitoring system. For example, the corrective action may comprise at least one of shutting down the air compressor, shutting down the recirculation system, turning on an alternative air source, and recommending a maintenance of the aircraft.

In some embodiments, the air quality monitoring system is configured for recording performance trends of the aircraft ventilation system over time.

In some embodiments, the air quality monitoring system is configured for monitoring degradation of air quality in the first air flow passage and the second air flow passage over time. For example, the air quality monitoring system is configured for identifying maintenance needs for the ventilation system based on the degradation as monitored over time.

In accordance with another broad aspect, there is provided a method for monitoring air quality of an aircraft, the method comprising: sensing air quality in a first air flow passage between an air compressor and a cabin in an aircraft ventilation system and generating air source sensing data; sensing air quality in a second air flow passage between a recirculation system and the cabin in the aircraft ventilation system and generating recirculation sensing data; monitoring degradation of air quality in the first air flow passage and the second air flow passage over time based on the air source sensing data and the recirculation sensing data; and identifying a maintenance need for the aircraft as a function of a determined degradation level.

In some embodiments, sensing air quality in the first air flow passage between the air compressor and the cabin comprises sensing air quality between the cabin and at least one of an engine and an auxiliary power unit. For example, sensing air quality in the first air flow passage between the cabin and at least one of an engine and an auxiliary power unit comprises sensing air quality in a third air flow passage between a left engine and the cabin and sensing air quality in a fourth air flow passage between a right engine and the cabin.

In some embodiments, the method further comprises sensing air quality in a fifth air flow passage between a left air conditioning system and the cabin, and in a sixth airflow between a right air conditioning system and the cabin, wherein the left air conditioning system is connected between the left engine and the cabin, and the right air conditioning system is connected between the right engine and the cabin.

In some embodiments, identifying a maintenance need comprises displaying the maintenance need on an engine-indicating and crew-alerting system (EICAS). Identifying a maintenance need may, for example, comprise determining a timeline for performing the maintenance need as a function of the degradation level.

In some embodiments, the method further comprises triggering an alert signal if the air quality falls below a threshold, the alert signal identifying at least one of the first air flow passage and the second air flow passage as a location for a possible contamination of the air quality in the aircraft. For example, triggering an alert signal comprises suggesting a corrective action for the possible contamination of the air quality in the aircraft. In another example, triggering an alert signal comprises applying a corrective action on the basis of a location of the possible contamination of the air quality in the aircraft. In some embodiments, the corrective action comprises at least one of shutting down the air compressor, shutting down the recirculation system, and turning on an alternative air source.

In the present description, the term "air compressor" is understood to mean a device which produces compressed air at elevated temperatures, such as a main engine, an auxiliary power unit (APU), an air compressor, or other air supply. The term "fresh air" is understood to mean air from external ambient.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
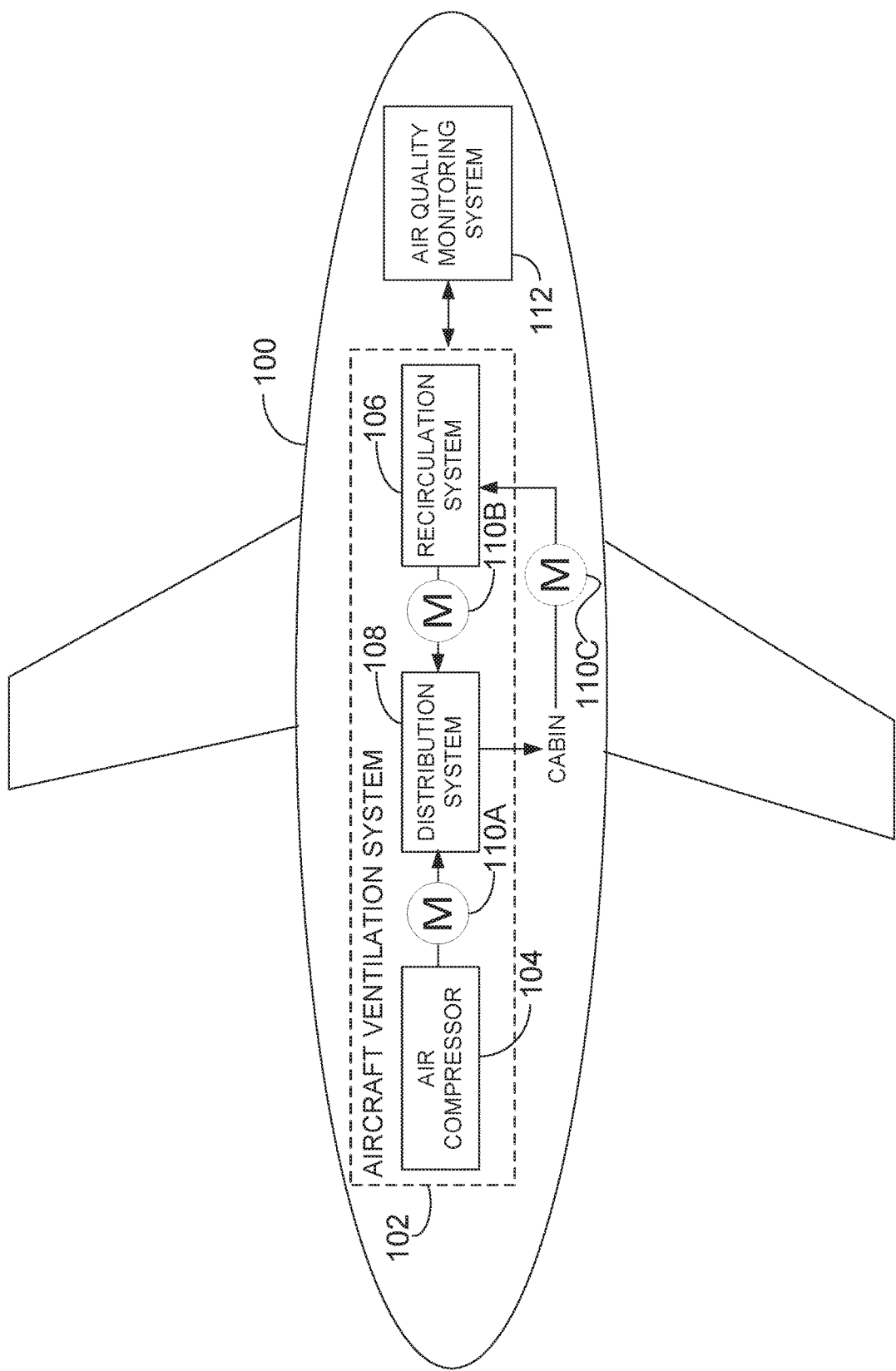
FIG. 1 illustrates an exemplary embodiment of an aircraft with an aircraft ventilation system and an air quality monitoring system.

Referring to FIG. 1, there is illustrated an aircraft 100 comprising an aircraft ventilation system 102. The ventilation system 102 distributes low-pressure air throughout the interior of the aircraft 100, including a cabin, a flight deck, aircraft bays, and a cockpit. For simplicity, the interior of the aircraft 100 will be referred to herein as the cabin. Air supplied to the cabin consists mainly of outside air from an air compressor 104 and filtered, recirculated air via a recirculation system 106. The air compressor 104 may comprise one or more main engines which supply bleed air, i.e. compressed outside air. The air compressor 104 may also comprise one or more auxiliary power units (APU) supplying bleed air. In some embodiments, the air compressor 104 comprises a combination of main engines and APUs which together are used to supply bleed air for distribution into the cabin. In a further alternative, the air compressor 104 may be a dedicated air compressor that is provided in order to supply fresh air to the cabin. In other embodiments, such as more electric aircraft applications, the bleed air may be supplied via motorized compressors.

A distribution system 108 receives compressed air from the air compressor 104 and recirculated air from the recirculation system 106, and distributes the air in the cabin. The compressed and recirculated air may be combined at a defined or variable ratio before being distributed in the cabin. At least one first sensor 110a is provided between the air compressor 104 and the distribution system 108 to monitor the air quality therebetween. At least one second sensor 110b is provided between the recirculation system 106 and the distribution system 108 to monitor the air quality therebetween. In an alternative embodiment, the second sensor 102b may be included as part of the recirculation system 106. Sensors 110a, 110b may comprise an array of sensors for identifying concentration levels of predefined airborne contaminants possibly existing in the respective inlet air flows. They may be positioned anywhere along the air flow passages between the air sources 104, 106, and the cabin.

An air quality monitoring system 112 is connected to the aircraft ventilation system 102 for communication therewith. The air quality monitoring system 112 may receive from the sensors 110a, 110b concentration levels of targeted volatile organic compounds (VOCs) or other potential contaminants to the air in the air flow passages of the aircraft. The sensors 110a, 110b may thus be VOC sensors or other air contaminant sensors, capable of detecting ppm concentrations of various contaminants such as oxygen, carbon monoxide, carbon dioxide, nitrogen dioxide, sulfur dioxide, and particulate matter. For example, the sensors 110a, 110b, may be heating semiconductor, non-dispersive infrared, and/or light emitting diode sensors; they may be based on micro-electro-mechanical systems (MEMS) and/or wireless sensor network (WSN) technology. The sensors 110a, 110b may be selected as a function of desired characteristics, such as size, accuracy, power consumption, and ability to detect one or more of the targeted air contaminants.

The air quality monitoring system 112, upon receipt of sensor data, may compare air contaminant concentration levels to one or more thresholds and determine the need to advise a flight crew of an anomaly with regards to air quality in a given air flow passage. In some embodiments, an alert signal is triggered when the air quality is found to be at an unacceptable level or at a level that is below optimal. There may be a single level that triggers the alert, or there may be multiple levels. The alert signal may be transmitted to the crew via a dedicated graphical user interface (GUI) provided for the flight crew, namely the pilot(s) and/or flight attendants. For example, an indicator may be provided directly on an instrument panel in the cockpit or flight deck to signal a problem with the air quality in one of the air flow passages. Alternatively, the air quality monitoring system 112 may interface with existing aircraft equipment, such as an Engine-Indication and Crew-Alerting System (EICAS) or other systems instrumentation, and the alert signal may be displayed on a GUI of the existing aircraft equipment.

In some embodiments, the air quality monitoring system 112 is configured to determine, from the sensor data, a location within the aircraft ventilation system 102 which may be the source of the air contaminant. For example, data received from sensor 110a may indicate that the bleed air from the air compressor 104 is unacceptably contaminated while data received from sensor 110b may indicate that air provided by the recirculation system 106 is not contaminated beyond acceptable limits. Other sensors may also be added within the aircraft ventilation system 102 in order to more specifically identify the source of the air contamination or a given air flow passage within the aircraft ventilation system 102. For example, another sensor 110c may be provided in an air flow passage between the cabin and the recirculation system 106. The air quality monitoring system 112 may therefore make a distinction between the quality of air entering the recirculation system 106 vs the quality of air exiting the recirculation system 106, thus determining if the problem is within the recirculation system 106 itself. In another example, the air compressor 104 comprises a left engine and a right engine, and the sensors 110 are positioned to allow the air quality monitoring system 112 to determine, from the sensor data, whether the source of the air contaminant is the left engine or the right engine. Comparison of sensor data form multiple sensors may be used to pinpoint the source of the problem.

In some embodiments, the air quality monitoring system 112 may also determine which corrective action may be taken in response to a determination that air quality in a given air flow passage comprises air contamination. For example, for ground operation, the air compressor 104 may be shut down and air distribution may rely only on the recirculation system 106 fitted with an advanced air filter. This corrective action may be used, for example, if it is determined that outside air passing through the air compressor 104 is contaminated, or that one of the engines has a contaminant emission. In one exemplary embodiment, this may occur when the aircraft is sitting on a runway waiting for takeoff and is surrounded by other aircraft that generate exhaust fumes and thus contaminate the "fresh air" source. Alternatively, the recirculation system 106 may be shut down and air distribution may rely only on the air compressor 104. In some embodiments, the ratio of compressed air to recirculated air may be varied to account for a reduced quality in any one of the air sources. Other examples of corrective actions are to activate an inactive air source or to recommend a maintenance (general or specific) to the aircraft ventilation system 102.

In some embodiments, the air quality monitoring system 112 is configured to display the corrective action to be taken on a GUI to the flight crew. Alternatively, or in combination therewith, the air quality monitoring system 112 may be configured to automatically apply the corrective action, depending on the nature of the corrective action. For example, a need for maintenance would simply be displayed while a change in a ratio of compressed air to recirculated air may be performed automatically. The air quality monitoring system 112 may thus be operatively connected to the aircraft ventilation system 102 for opening, closing, or regulating various inlet and outlet valves, shutting down and turning on air sources in the air compressor 104 or the recirculation system 106, and providing command signals to the distribution system 108 for control of air flow to the cabin. Note that the distribution system 108 may, in some embodiments, comprise air conditioning and/or flow control units. Control may be effected via command signals transmitted through the existing aircraft wiring harnesses and cable assemblies, through dedicated wiring/cabling, through a wireless network, or through a combination thereof. The wireless network may operate using RF, infrared, Wi-Fi, Bluetooth, or other wireless technologies.

Figure 2A:
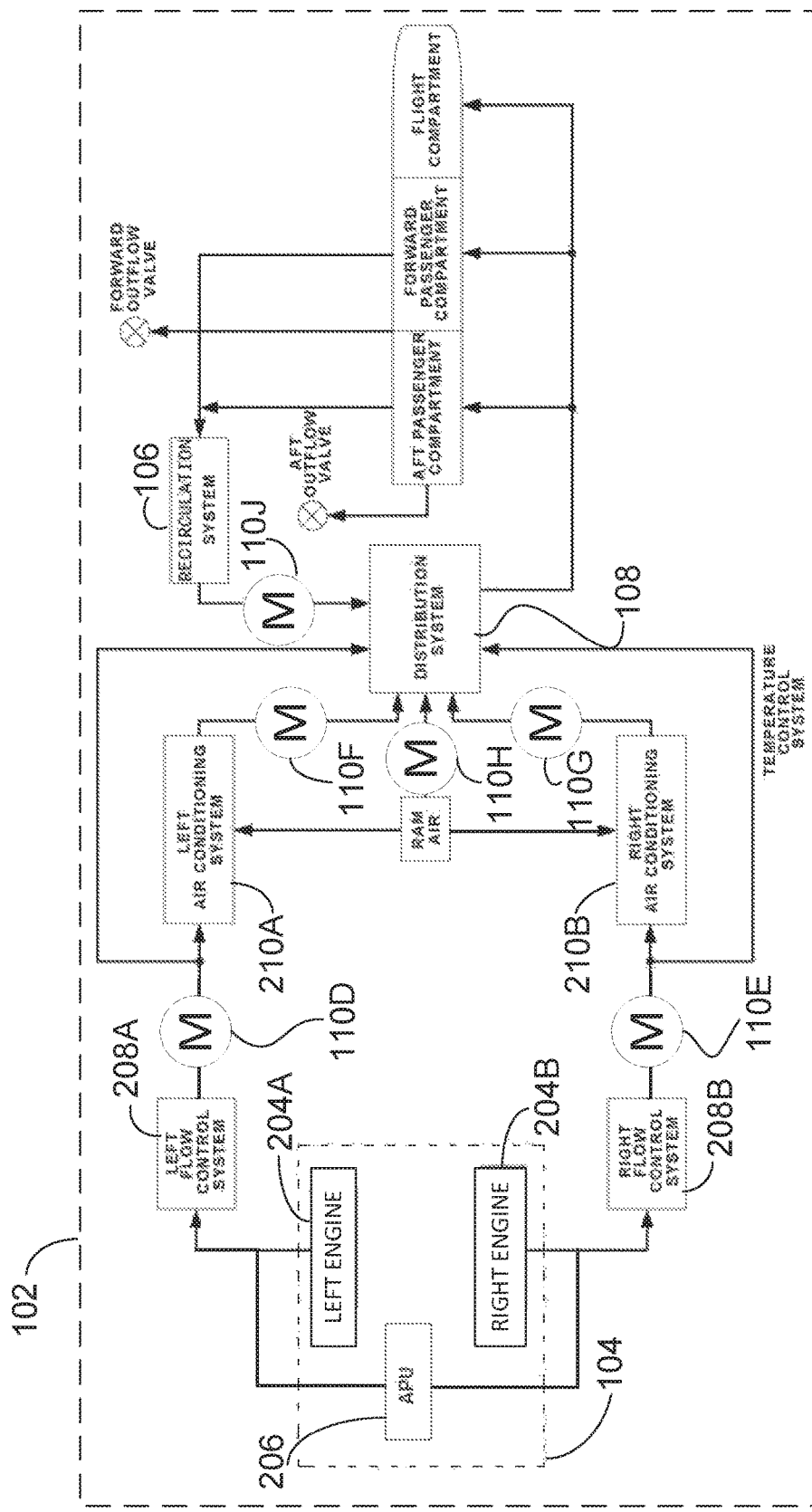
FIG. 2a is an exemplary embodiment of an aircraft ventilation system comprising air quality sensors.

FIG. 2a is a more detailed example of the aircraft ventilation system 102, in accordance with one embodiment. In this example, the air compressor 104 comprises a left engine 204a, a right engine 204b, and an APU 206. Compressed air from the left engine 204a and/or APU 206 flows through a left flow control system 208a and a left air conditioning system 210a before reaching the distribution system 108. Compressed air from the right engine 204b and/or APU 206 flows through a right flow control system 208b and a right air conditioning system 210b before reaching the distribution system 108. A plurality of sensors 110d, 110e, 110f, 110g, 110h, 110j (collectively referred to as sensors 110) are provided throughout the system 102 for collecting sensor data and transmitting the sensor data to the air quality monitoring system 112.

Figure 2B:
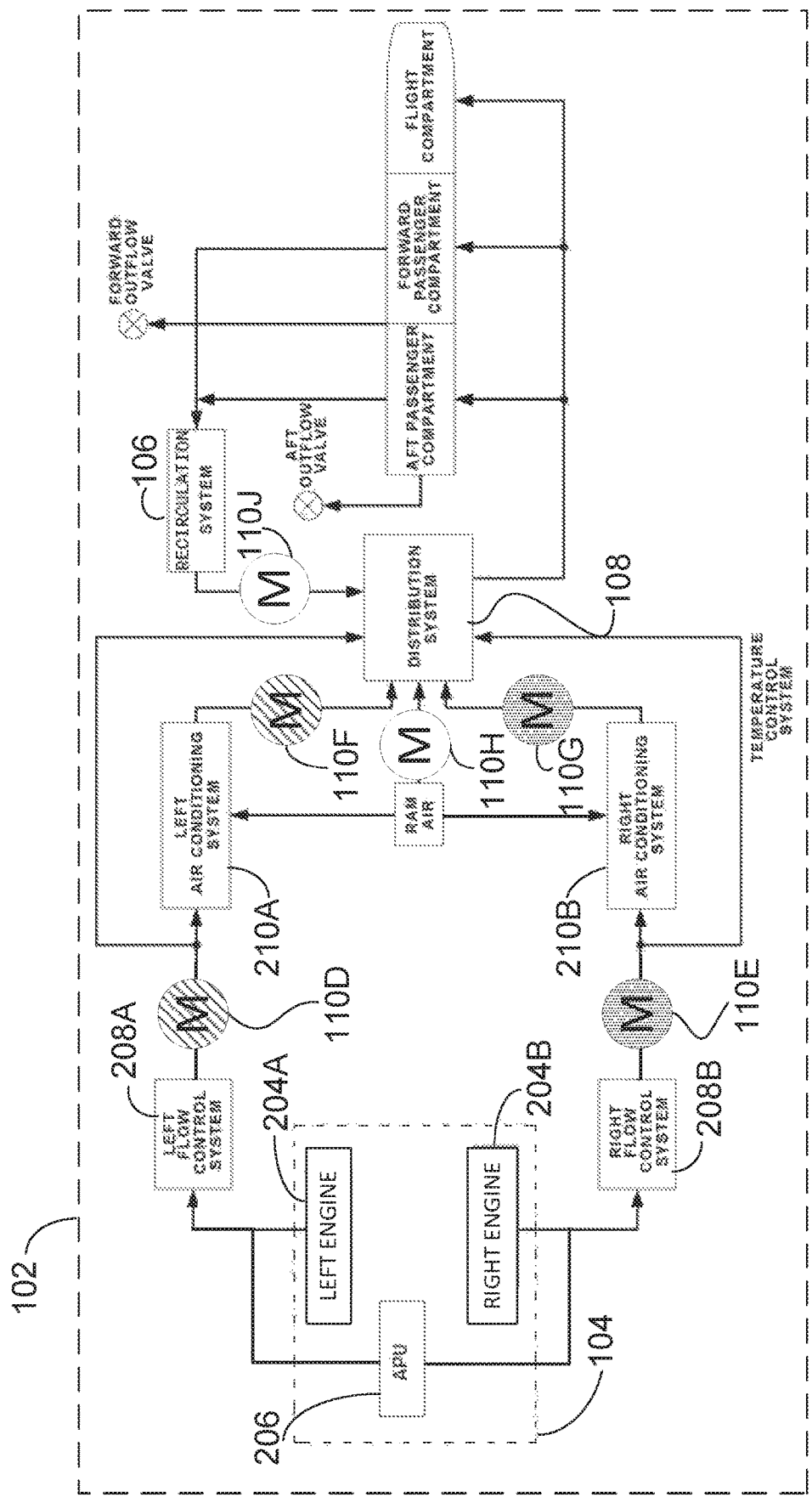
FIGS. 2b, 2c, 2d illustrate exemplary scenarios for air quality detection by the air quality monitoring system.
Figure 2C:
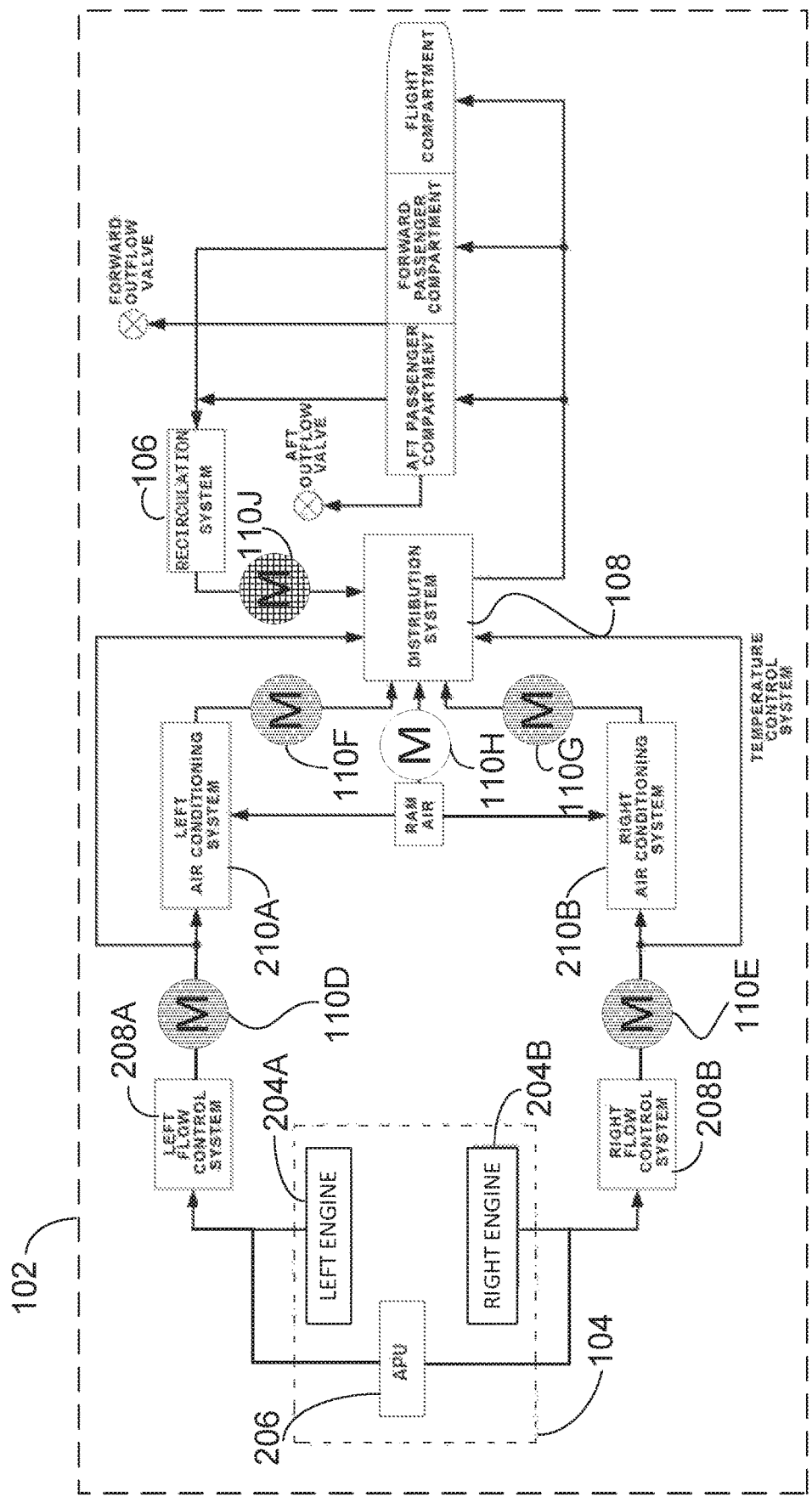
Figure 2D:
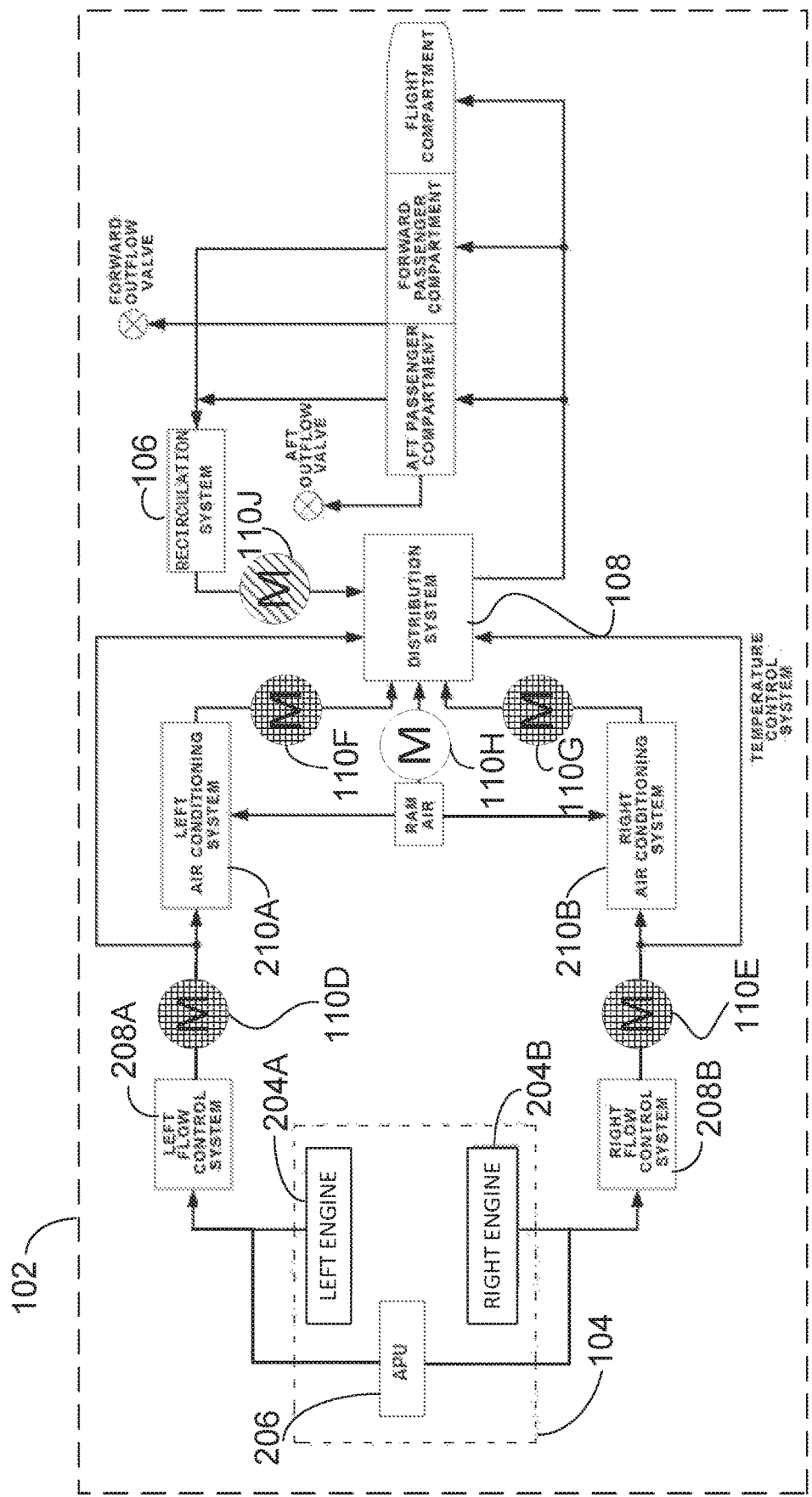

A series of exemplary scenarios are illustrated in FIGS. 2b to 2d. For these examples, the legend for reading sensor data is provided in table 1. The three levels of air quality are for illustrative purposes. More or less air quality levels may be used.

TABLE 1

| No air flow | Ⓜ |
| Acceptable level | ⊛ |
| Below optimal level | ⊛ |
| Unacceptable level | ⊛ |

In FIG. 2b, the left and right engines 204a, 204b act as air sources and the recirculation system 106 is inactive. Sensor data from sensor 110d indicates that the left engine 204a has a contaminant emission. The air quality monitoring and control system 112 may recommend maintenance to the left engine 204a. Sensor data from sensor 110F may also indicate that the left air conditioning system 210a still has a contaminated air flow. The recirculation system 106 may be activated to compensate, together with the operational right engine 204b bleed system.

In FIG. 2c, the APU 206 acts as air source and the recirculation system 106 is active. Sensor data from sensor 110j indicates that air from the recirculation system is contaminated at an unacceptable level. The air quality monitoring system 112 may shut down the recirculation system 106 such that only air from the air compressor 104 is circulated in the cabin via the distribution system 108. A maintenance request may also be provided for the recirculation system 106.

In FIG. 2d, the left and right engines 204a, 204b act as air sources and the recirculation system 106 is active. Sensor data from sensors 110d, 110e, 110f, 110g indicate that external air coming through the air compressor 104 is contaminated. Sensor data from sensor 110j also indicates that the air flowing through the recirculation system 106 is below optimal level, likely due to the contamination from the outside air mixed with the recirculated air before being distributed into the cabin. If this scenario occurs when the aircraft 100 is on the ground, the external air may be shutoff and recirculation may be increased. This corrective action can be verified as being effective when sensor 110j changes to an acceptable level.

The scenarios of FIGS. 2b, 2c, and 2d illustrate examples of the ability to identify a potential problem, locate an origin of the problem within one of the air flow passages, and provide corrective actions as appropriate. Smells, odors, smoke, and other contaminant events may occur while the aircraft is on the ground or in the air. The air quality monitoring system 112 may provide real time airborne contaminant monitoring and control, resulting in a reduction in costs and potential aircraft and occupant safety due to flight interruptions, flight delays, misled troubleshooting, component repairs, and air contamination exceedance. Monitoring the air quality in the various air flow passages may also allow a reduction to specific fuel consumption (SFC) of the aircraft due to a reduction of external air (also known as "fresh" air) mass flow when possible.

Figure 3:
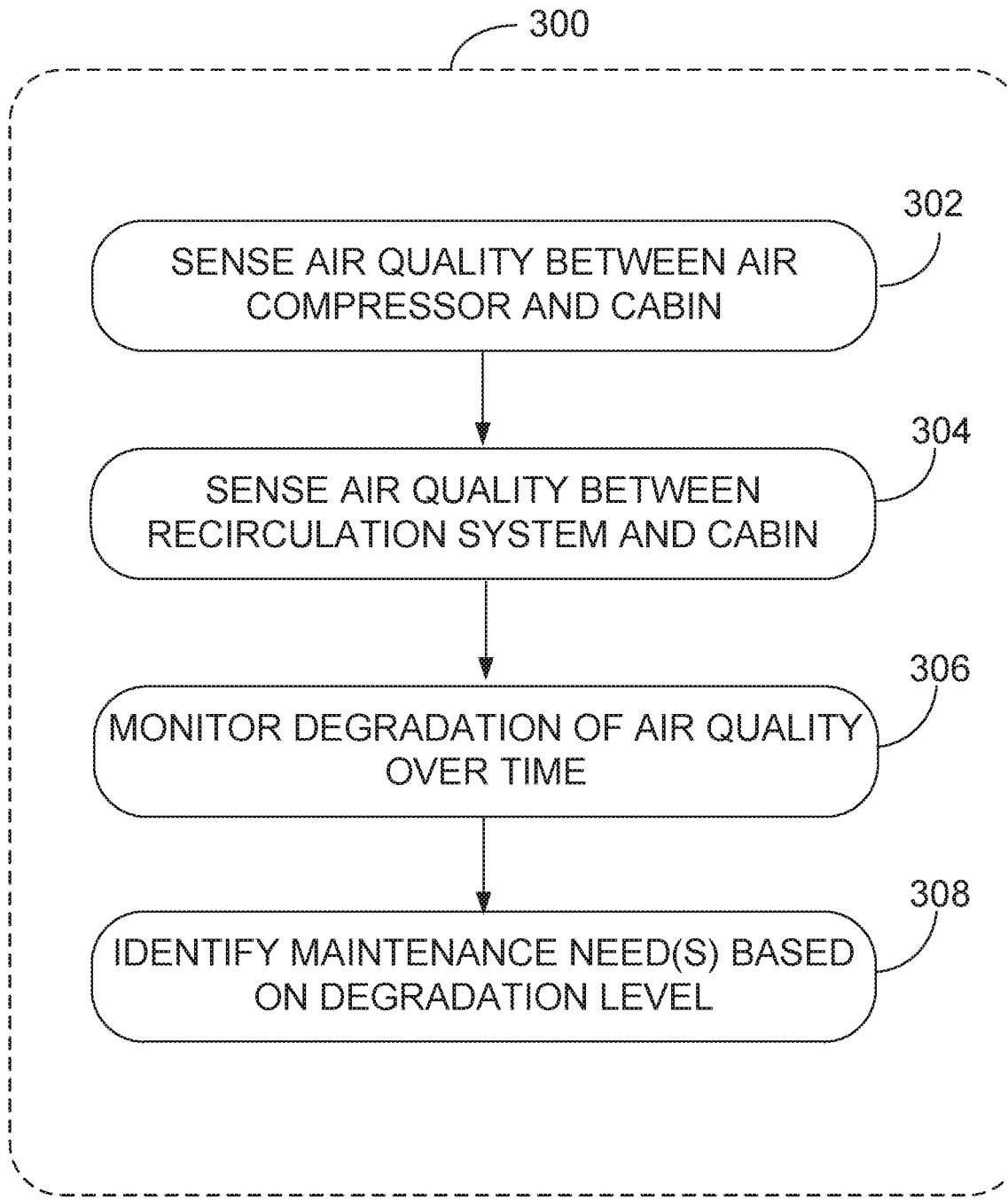
FIG. 3 is a flowchart of an exemplary method for monitoring air quality in an aircraft.

In some embodiments, the air quality monitoring system 112 is also configured for monitoring degradation of air quality in a particular air flow passage over time. This may allow the air quality monitoring system 112 to monitor component performance and degradation trends of the aircraft ventilation system 102, allowing for broad preventive maintenance actions to be scheduled. An exemplary method is illustrated in the flowchart of FIG. 3. Method 300 is for monitoring air flow passage air quality. Steps 302, 304 represent sensing of air quality in multiple air flow passages between the ventilation system 102 and the cabin. These air flow passages may be between the air compressor 104 and the distribution system 108 and between the recirculation system 106 and the distribution system 108, as illustrated in FIG. 1. The air flow passages may also be the various passages illustrated in FIG. 2a. Other air flow passages for other aircraft ventilation system architectures may be monitored with sensors. Strategically located sensors 110 will allow more precise diagnostics to be provided. As per step 306, the degradation of air quality within the air flow passages is monitored over time. This monitoring can take place over a single flight or over a plurality of flights. For example, sensor data may be gathered over predetermined periods, such as weeks, months, or years, for analysis of trends over the periods to assess the maintenance needs of the aircraft. As per step 308, maintenance needs for the various components of the aircraft ventilation system 102 are identified as a function of the degradation level of the air quality within the air flow passages over time.

Similarly to real-time monitoring and control, maintenance needs may be displayed on a dedicated GUI or an existing aircraft display/equipment such as the EICAS. In addition, sensing data and/or air quality reports may be provided to ground crew, using for example an Aircraft Communications Addressing and Reporting System (ACARS) or other communication means with ground stations. The air quality monitoring system 112 may interface with a cabin management system (CMS) or a maintenance computer, for storing maintenance messages showing degradation of air quality within the air flow passages or degradation of components of the ventilation system 102, indicating that a replacement is needed at a next aircraft maintenance check or earlier. Specific timelines for performing maintenance may be provided as a function of the degradation level. For example, degradation may be graded according to a scale, with a projected maintenance timeline associated with each level of the scale. Table 2 illustrates an exemplary maintenance report.

TABLE 2

| Component | Maintenance Task | Degradation Level | Projected Maintenance Timeline |
|---|---|---|---|
| Recirculation filter A | Replacement | Level 4 | Immediately |
| Recirculation filter B | Replacement | Level 1 | 12 months |
| Left engine | Replace bearing, seal, gasket | Level 2 | 6 months |
| APU | Clean | Level 3 | 3 months |

More or less degradation levels may be used. Projected maintenance timelines may also vary as a function of the component and how long it is known to take to further degrade. Some components may be graded using only two levels, such as check or don't check, while others may be graded using a progressive scale that is incremented as the component further degrades, or as the air quality sensed downstream from the component further degrades. In some embodiments, air quality is directly correlated to degradation of a component and used to assess maintenance needs.

Figure 4:
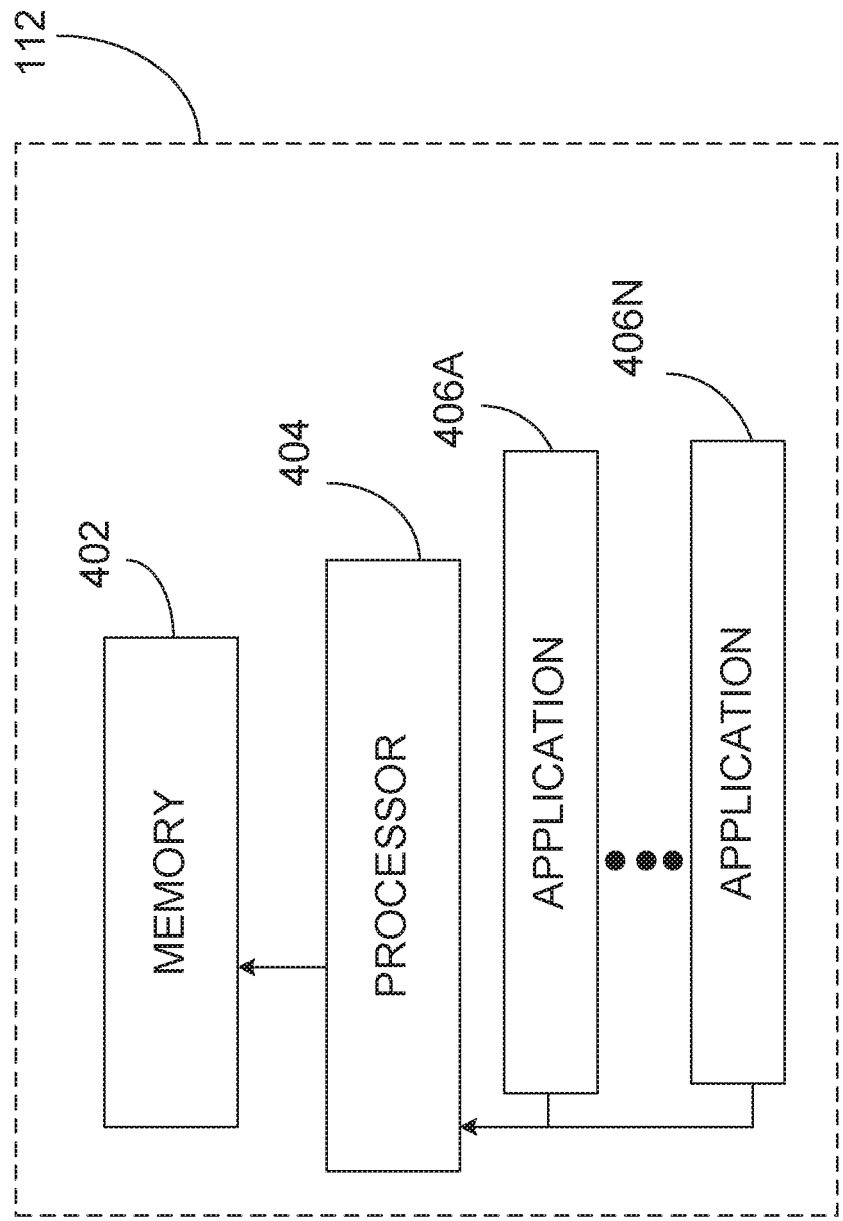
FIG. 4 is a block diagram of an exemplary embodiment of the air quality monitoring system.

Referring to FIG. 4, there is illustrated an exemplary embodiment of the air quality monitoring system 112, which comprises, amongst other things, a plurality of applications 406a . . . 406n running on a processor 404 coupled to a memory 402. It should be understood that while the applications 406a . . . 406n presented herein are illustrated and described as separate entities, they may be combined or separated in a variety of ways.

The memory 402 accessible by the processor 404 may receive and store data. The memory 402 may be a main memory, such as a high speed Random Access Memory (RAM), or an auxiliary storage unit, such as a hard disk, a floppy disk, or a magnetic tape drive. The memory 402 may be any other type of memory, such as a Read-Only Memory (ROM), or optical storage media such as a videodisc and a compact disc. The memory 402 illustratively has stored therein any one of sensor data, corrective actions, degradation levels, performance trends, maintenance schedules, and grading scales.

The processor 404 may access the memory 402 to retrieve data. The processor 404 may be any device that can perform operations on data. Examples are a central processing unit (CPU), a front-end processor, a microprocessor, and a network processor. The applications 406a . . . 406n are coupled to the processor 404 and configured to perform various tasks.

In some embodiments, the air quality monitoring system 112 is a downloaded software application, a firmware application, or a combination thereof on an existing aircraft system. Alternatively, dedicated hardware is provided for the air quality monitoring system 112 and connected to the aircraft for communication with the sensors 110, the aircraft ventilation system 102, and any other equipment and/or system onboard with which it is to interface. In some embodiments, the air quality monitoring system 112 is remotely accessible via a device such as a personal computer, a tablet, a smartphone, or the like, via a wired or wireless connection. In some embodiments, the air quality monitoring system 112 may itself be provided directly on one of the devices, either as a downloaded software application, a firmware application, or a combination thereof.

Figure 5:
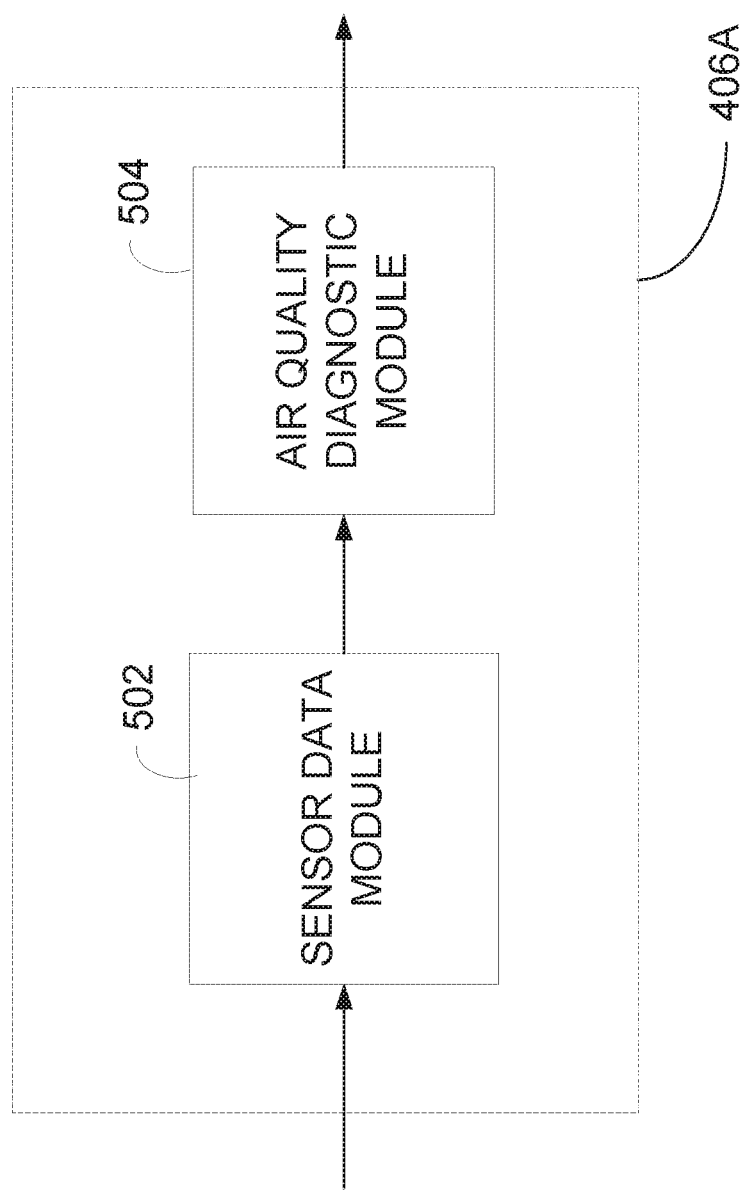
FIG. 5 is a block diagram of an exemplary application running on a processor of the air quality monitoring system.

FIG. 5 is an exemplary embodiment of an application 406a running on the processor 404. The application 406a illustratively comprises a sensor data module 502 and an air quality diagnostic module 504. The sensor data module 502 is configured to receive sensor data from all of the sensors 110 provided throughout the aircraft ventilation system 102. It may be configured to sort through the sensor data in order to identify a location from which the sensor data is received. Sensor data may be received with identification data in order to determine the sensor from which the data is received. The air quality diagnostic module is configured to determine, based on the sensor data, air quality for individual air flow passages of the aircraft ventilation system 102.

Figure 6:
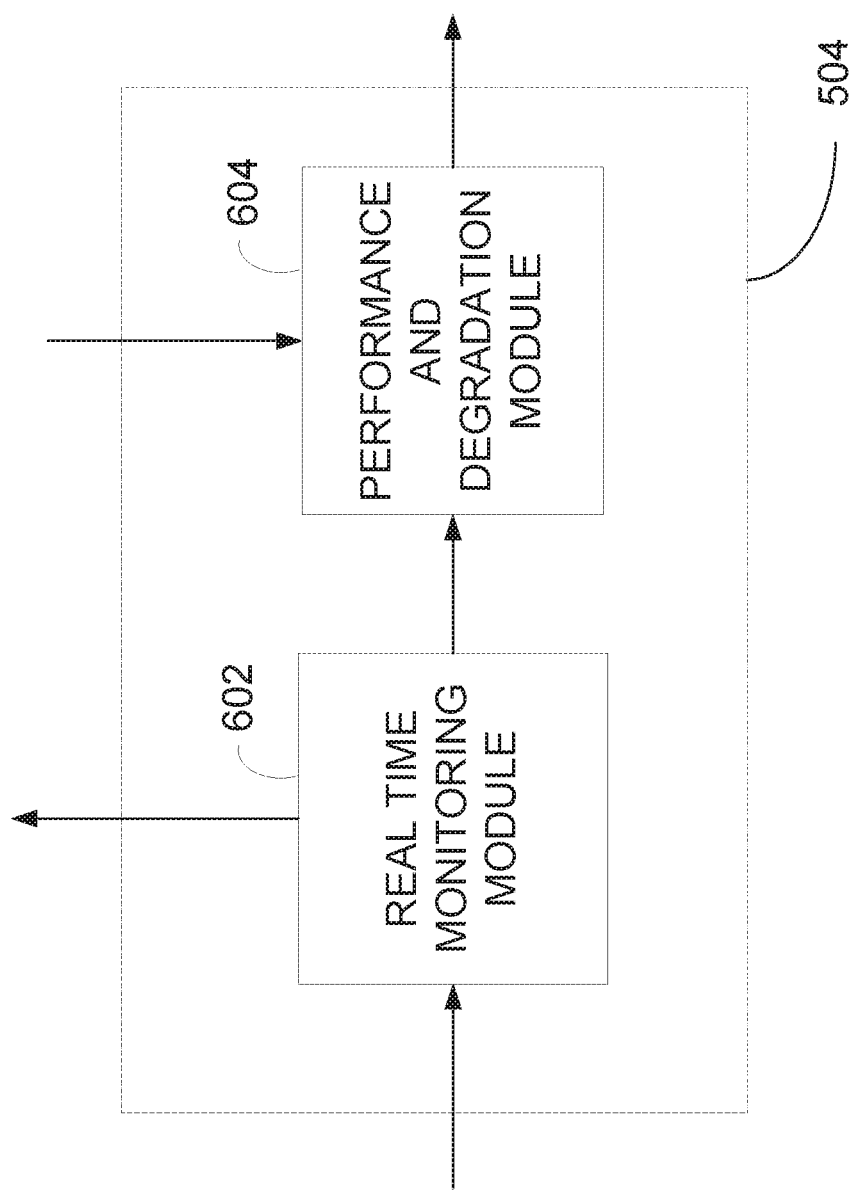
FIG. 6 is a block diagram of an exemplary embodiment of an air quality diagnostic module.

As per FIG. 6, the air quality diagnostic module 504 may be separated into a real time monitoring module 602 and a performance and degradation module 604. Some embodiments may comprise only one of these two modules 602, 604. The real time monitoring module 602 may be configured to perform air quality monitoring in real time, in any one of a passive, an active, and an active control mode. In passive mode, the real time monitoring module 602 may trigger an alert signal if any concentration level of the sensed air flow passages are above or below a given threshold. The alert signal may comprise a location for the possible contamination within the aircraft 100. In active mode, the real time monitoring module 602 may provide a recommended corrective action or operational task to address detected concentration levels above or below given thresholds. The recommended corrective actions may be displayed for the flight crew as soon as the issue is detected. In active control mode, the real time monitoring module 602 may automatically perform some of the corrective actions, such as shutting down one or more air source, activating one or more air source, and varying a ratio of conditioned air to recirculated air that is distributed within the aircraft cabin.

The performance and degradation module 604 may be coupled to the real time monitoring module 602, for example for receiving sensor data and/or concentration measurements therefrom, or it may operate independently. It may be configured for monitoring degradation of the air quality over time based on the sensor data, and for identifying one or more maintenance needs for the various components in the aircraft ventilation system 102 as a function of the degradation level of the air quality.

It will be understood that the real time monitoring module 602 and the performance and degradation module 604 may be provided as a single module that can perform both real time monitoring and performance and degradation assessments. Similarly, these two functions may be provided in separate applications 406*a*, 406*n*, that run separately on the processor 404. Also alternatively, the two functions may be provided in separate applications that run on separate processors. Other alternative configurations for the software/hardware architecture of the air quality monitoring system 112 will be readily understood by those skilled in the art. The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. An aircraft comprising:
 a first sensor between an air compressor and an aircraft cabin for sensing a first concentration level of at least one predefined airborne contaminant in a first air flow passage in an aircraft ventilation system, the first airflow passage being configured to convey compressed air from the air compressor towards the aircraft cabin;
 a second sensor between an aircraft recirculation system and the aircraft cabin for sensing a second concentration level of the at least one predefined airborne contaminant in a second air flow passage in the aircraft ventilation system, the second airflow passage being configured to convey cabin air from the aircraft cabin towards the recirculation system;
 a sensor data module configured to receive sensor data from the first and second sensors, the sensor data module being configured to identify a respective location from which the sensor data is received;
 an air quality monitoring system connected to the sensor data module, and configured for triggering an alert signal when either one of the first concentration level and the second concentration level exceeds a threshold, said excess of the threshold being indicative of an air contamination in the aircraft, the alert signal comprising a location for the air contamination and identifying at least one of the first air flow passage and the second air flow passage as the location for the air contamination in the aircraft; and
 a distribution system configured to combine the compressed air from the air compressor and recirculated air from the recirculation system, and distribute the combined compressed air and recirculated air to the cabin,
 wherein the air quality monitoring system is configured to automatically perform a corrective action when the location of the air contamination is in the first airflow passage, the corrective action including at least shutting down the compressor.

2. The aircraft of claim 1, wherein the air compressor comprises at least one of an engine and an auxiliary power unit.

3. The aircraft of claim 2, wherein the engine comprises a left engine and a right engine, and wherein the first sensor comprises a left engine sensor and a right engine sensor.

4. The aircraft of claim 3, further comprising a third sensor between a left air conditioning system and the cabin, and a fourth sensor between a right air conditioning system and the cabin, wherein the left air conditioning system is connected between the left engine and the cabin, and the right air conditioning system is connected between the right engine and the cabin.

5. The aircraft of claim 1, wherein the air quality monitoring system interfaces with an engine-indicating and crew-alerting system (EICAS) to provide the alert signal and display a corrective action to the flight crew.

6. The aircraft of claim 1, wherein the corrective action further comprises at least one of shutting down the recirculation system, turning on an alternative air source, and recommending a maintenance of the aircraft.

7. The aircraft of claim 1, wherein the air quality monitoring system is configured for recording performance trends of the aircraft ventilation system over time.

8. The aircraft of claim 1, wherein the air quality monitoring system is configured for monitoring degradation of air quality in the first air flow passage and the second air flow passage over time.

9. The aircraft of claim 8, wherein the air quality monitoring system is configured for identifying maintenance needs for the ventilation system based on the degradation as monitored over time.

10. A method for monitoring air quality of an aircraft, the method comprising:
sensing air quality in a first air flow passage conveying compressed air from an air compressor towards a cabin in an aircraft ventilation system and generating air source sensing data;
sensing air quality in a second air flow passage conveying cabin air from the cabin towards a recirculation system in the aircraft ventilation system and generating recirculation sensing data;
receiving the air source sensing data and the recirculation sensing data from sensors sensing the air quality in the first and second airflow passages respectively, and identifying a respective location from which the air source sensing data and the recirculation sensing data are received;
monitoring degradation of the air quality in the first air flow passage and the second air flow passage over time based on the air source sensing data and the recirculation sensing data; and
identifying a maintenance need for the aircraft as a function of a determined degradation level in the air quality in either one of the first air flow passage and the second air flow passage, and identifying a location of said maintenance need based on the location from which the sensing data associated with said determined degradation level is received; and
triggering an alert signal when the air quality falls below a threshold, the alert signal identifying at least one of the first air flow passage and the second air flow passage as a location of air contamination in the aircraft;
wherein triggering the alert signal comprises suggesting a corrective action for the air contamination in the aircraft and applying the corrective action on the basis of the location of the air contamination in the aircraft when the location of the air contamination is in the first airflow passage, the corrective action including at least shutting down the compressor.

11. The method of claim 10, wherein sensing air quality in the first air flow passage comprises sensing air quality between the cabin and at least one of an engine and an auxiliary power unit.

12. The method of claim 11, wherein sensing air quality in the first air flow passage between the cabin and at least one of an engine and an auxiliary power unit comprises sensing air quality in a third air flow passage between a left engine and the cabin and sensing air quality in a fourth air flow passage between a right engine and the cabin.

13. The method of claim 12, further comprising sensing air quality in a fifth air flow passage between a left air conditioning system and the cabin, and in a sixth airflow between a right air conditioning system and the cabin, wherein the left air conditioning system is connected between the left engine and the cabin, and the right air conditioning system is connected between the right engine and the cabin.

14. The method of claim 10, wherein identifying a maintenance need comprises displaying the maintenance need on an engine-indicating and crew-alerting system (EICAS).

15. The method of claim 10, wherein identifying a maintenance need comprises determining a timeline for performing the maintenance need as a function of the degradation level.

16. The method of claim 10, wherein the corrective action further comprises at least one of shutting down the recirculation system and turning on an alternative air source.

* * * * *